No. 873,687. PATENTED DEC. 10, 1907.
G. B. SHIPLEY.
ROASTING FURNACE SHAFT.
APPLICATION FILED AUG. 20, 1906.
4 SHEETS—SHEET 1.
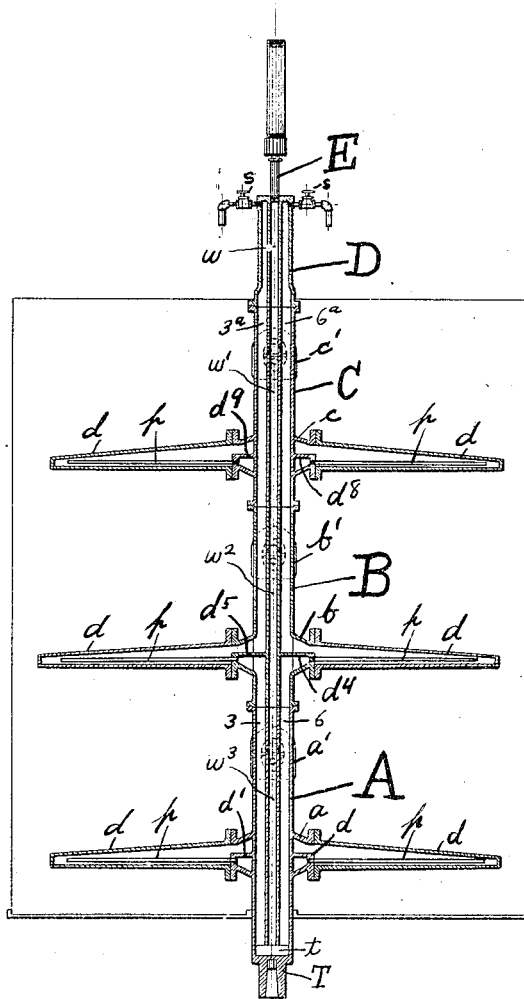
Fig. I.
WITNESSES:
Frank E. Dennett
Ella Brickell
G. B. Shipley INVENTOR
BY
ATTORNEY.

No. 873,687. PATENTED DEC. 10, 1907.
G. B. SHIPLEY.
ROASTING FURNACE SHAFT.
APPLICATION FILED AUG. 20, 1906.
4 SHEETS—SHEET 2.
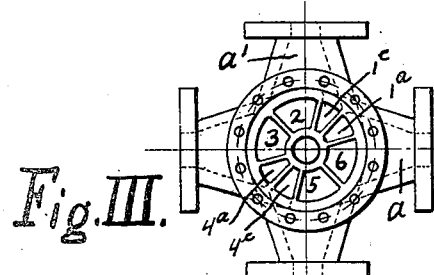
Fig. III.
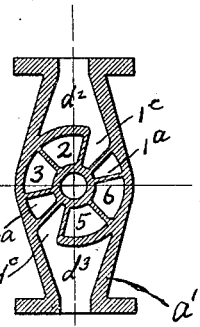
Fig. VII.
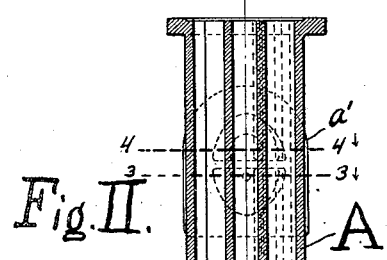
Fig. II.
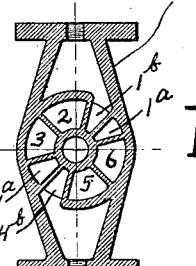
Fig. VI.
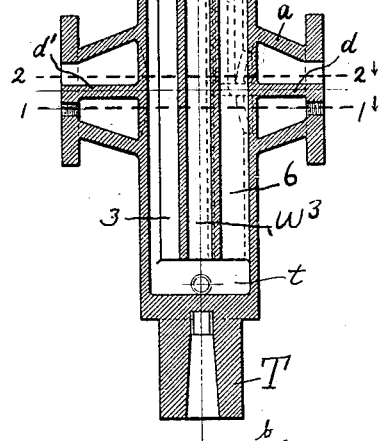
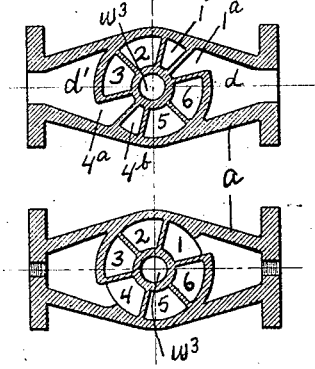
Fig. V.
Fig. IV.
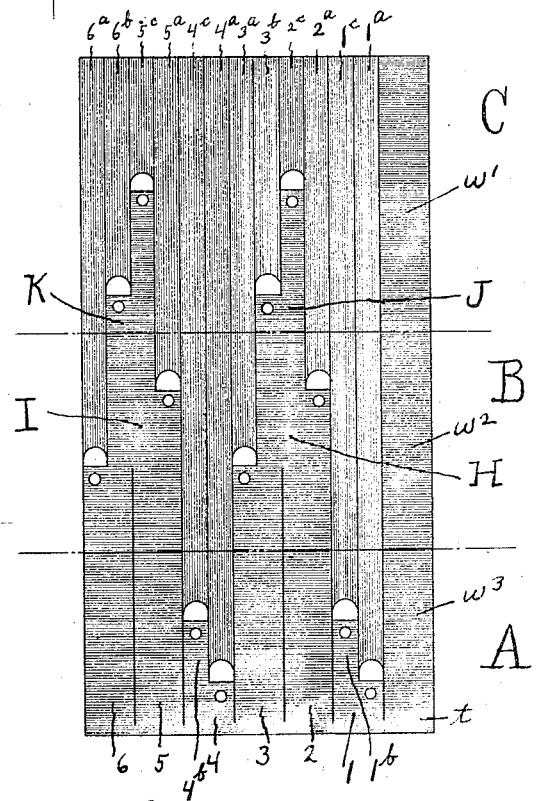
Fig. XXI.
WITNESSES:
Frank E. Dennett
Ella Brickell
G. B. Shipley  INVENTOR
BY
G. J. DeWein  ATTORNEY.

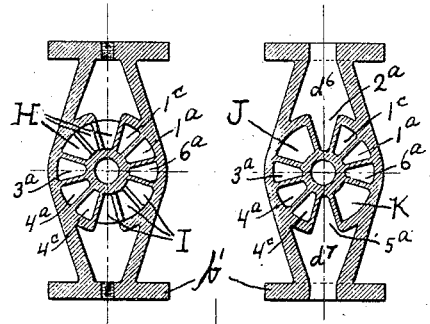
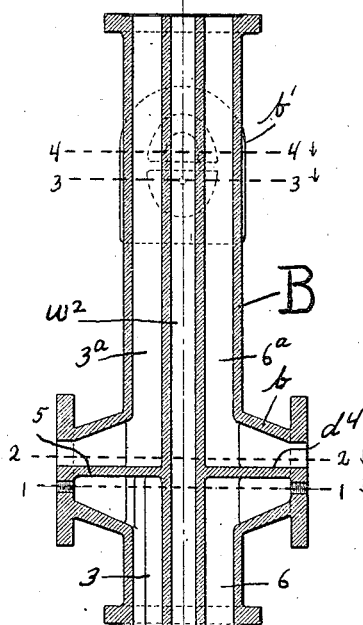
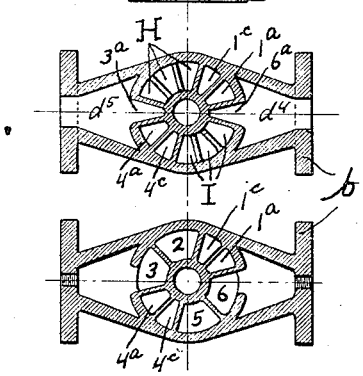

No. 873,687. PATENTED DEC. 10, 1907.
G. B. SHIPLEY.
ROASTING FURNACE SHAFT.
APPLICATION FILED AUG. 20, 1906.
4 SHEETS—SHEET 4.
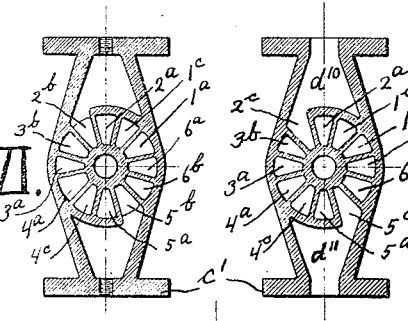
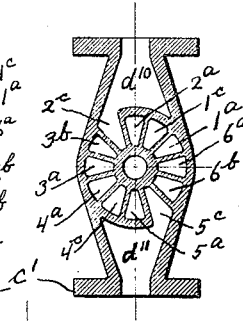
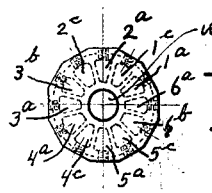
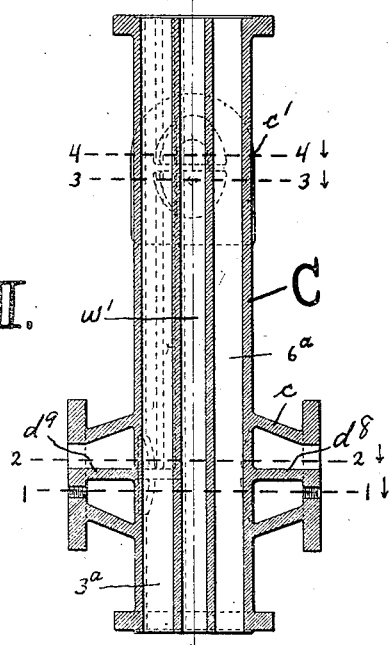
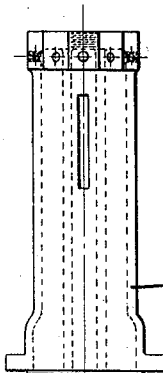
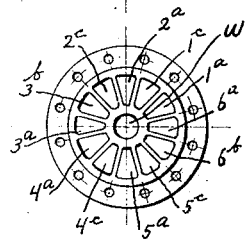
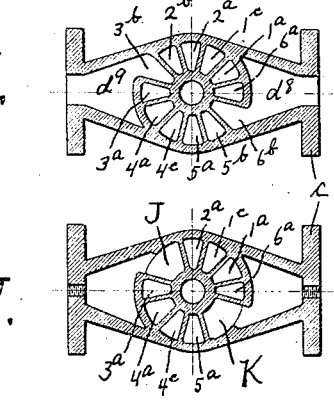
WITNESSES:
Frank E. Dennett
Ella Brickell
G. B. Shipley INVENTOR
BY
G. J. DeWein ATTORNEY.

UNITED STATES PATENT OFFICE.

GRANT B. SHIPLEY, OF MILWAUKEE, WISCONSIN, ASSIGNOR TO ALLIS-CHALMERS COMPANY, OF MILWAUKEE, WISCONSIN, A CORPORATION OF NEW JERSEY.

ROASTING-FURNACE SHAFT.

No. 873,687.     Specification of Letters Patent.     Patented Dec. 10, 1907.

Application filed August 20, 1906. Serial No. 331,285.

*To all whom it may concern:*

Be it known that I, GRANT B. SHIPLEY, a citizen of the United States, residing at Milwaukee, in the county of Milwaukee and State of Wisconsin, have invented a certain new and useful Roasting-Furnace Shaft, of which the following is a specification.

This invention relates to stirrers for furnaces, etc., and has reference specifically to a construction whereby the flow of a cooling medium through a shaft and arms may be readily controlled in order that any individual arm may receive a supply of the cooling fluid in proportion to the amount of heat to which said arm is exposed.

More specifically the invention relates to stirring means which may be employed for agitating a mass or masses of heated material, said material either being in bulk or disposed upon a plurality of separate floors or hearths, the construction of the stirrer being such that a supply of cooling fluid is supplied to each one of a plurality of arms while the fluid which has been caused to circulate through any individual arm is returned separately to an individual outlet or overflow.

By controlling the outflowing fluid from each of the several arms separately, the condition of each of said arms can be readily ascertained by the temperature of the fluid flowing therefrom, and the flow through either of said arms can be proportioned to the heating effect of an arm upon the cooling fluid passed therethrough. In this way complete and accurate control is had of the temperature of each of the several arms.

In the drawings which illustrate an embodiment of this invention and on which the same reference characters refer to the same elements in each of the several views,—Figure 1 is a vertical section through a shaft and arms of a stirring device constructed according to this invention, the stirrer being shown as located in a conventional form of receptacle, and in this specific instance the shaft being shown as composed of the sections A, B, C, D. Fig. 2 is a sectional elevation of the lower member A of the shaft shown in Fig. 1. Fig. 3 is a plan view, Fig. 4 is a transverse section taken on the line 1—1; Fig. 5 is a transverse section taken on the line 2—2; Fig. 6 is a transverse section taken on the line 3—3; and Fig. 7 is a transverse section taken on the line 4—4 of the member shown by Fig. 2. Fig. 8 is a vertical section of the member B of the shaft as shown by Fig. 1. Fig. 9 is a transverse section on the line 1—1; Fig. 10 is a transverse section on the line 2—2; Fig. 11 is a transverse section on the line 3—3; and Fig. 12 is a transverse section on the line 4—4 of the member shown by Fig. 8. Fig. 13 is a sectional elevation of the member C of the shaft as shown by Fig. 1. Fig. 14 is a transverse section on the line 1—1; Fig. 15 is a transverse section on the line 2—2; Fig. 16 is a transverse section on the line 3—3; and Fig. 17 is a transverse section on the line 4—4 of the member shown by Fig. 13. Fig. 18 is an elevation of the member D of the shaft shown by Fig. 1. Fig. 19 is a plan view of the top of said section. Fig. 20 is a plan view of the bottom of said section looking upward towards said member as shown by Fig. 18. Fig. 21 is a schematic development of the three members of the shaft A, B and C shown by Figs. 1, 2, 8 and 13, showing clearly the course taken by the cooling fluid through the several channels formed in the shaft by said members.

Each of the sections of the members A, B and C is shown when looking downward or in the direction indicated by the arrows placed near the section lines which are shown by Figs. 2, 8 and 13.

The reference letter E represents a pipe by which a cooling fluid, preferably water, is supplied to the shaft and arms. This pipe is in open communication with the passageway which extends downwardly through the center of the shaft as a whole and which is formed by the passageway $w$ in the member D, $w'$ in the member C, $w^2$ in the member B, and $w^3$ in the member A, these passageways formed in the several members being adapted to form a continuous passageway as shown by Fig. 1 when the several members are assembled to form a shaft.

Each of the several members A, B, C and D are composed of an exterior wall or shell, an interior wall by which the passageways referred to above are formed, and a plurality of radial ribs or partitions connecting these two walls and forming passageways for the cooling fluid.

Referring to Fig. 1, the lowermost member A is provided at the bottom with a step bearing T upon which the shaft is adapted to be supported. The partitions and the central wall in this section are not continued to the bottom of the member, but terminate a short distance above said bottom, leaving a space $t$ which forms a means of communication between each of the several passages formed in the lower part of this member.

The member A is provided with the projections $a$, $a'$, and the members B and C are provided with the projections $b$, $b'$, $c$, $c'$, respectively, to which are secured hollow arms $d$. As clearly shown by Fig. 1 of the drawings, these projections are provided with transverse partitions which interrupt the continuity of passages through the shaft, the effect of such interruption being to cause the fluid ascending through the several passages to be diverted through the pipes $p$ into the ends of the arms $d$ instead of passing directly up the shaft. For example, looking at Fig. 1 it will be seen that water being admitted through the pipe E will pass down through the passages $w$, $w'$, $w^2$, $w^3$, into the space $t$, from thence it will pass up through the left hand passage 3 until stopped by the partition $d^5$, which will cause it to pass out through the pipe $p$ into the end of the arm $d$ and then return through said arm into the passage $3^a$, and will be discharged through the overflow pipe shown at the top and left hand side of said figure. Water from the pipe E will also take the course just indicated, but will pass from the space $t$ up through the passage 6 until arrested by the partition $d^4$, when it will pass through the pipe $p$ into the arm $d$, thence up through the passage $6^a$. In general it may be stated that a similar course is provided for the water through each one of the several arms, the purpose being to cause the water to be discharged into each of the several arms and to compel the water flowing from each of the several arms to be confined in a separate passage. The specific construction adopted to accomplish this result is easily traced from the several figures of the drawings.

Fig. 4 shows the lower part of the member A as provided with six passages which are all in communication with the space $t$, and through space $t$ are in communication with the passageway $w^3$. The number of these spaces is selected as six as a matter of convenience in the construction shown which has twelve arms. Each of these passages, as the fluid ascends the shaft, is divided into two passages, each of which provides a return channel from one of the arms. For example, starting from space $t$ in the bottom of the member A, the water passes upward through the passage 1 until it meets the partition $d$, then passes out through pipe $p$ back through the arm above the partition $d$, thence upwardly as heated water through the passageway $1^a$. By reference to each of the succeeding figures of the drawing it will be noticed that this passageway $1^a$ is maintained as a separate and continuous passageway up to its individual overflow or waste pipe. In like manner the water which passed up through the passageway 1 and which was not intercepted by the partition $d$ (see Fig. 5), continued upward through the other half of the now subdivided passageway 1, namely, the passageway $1^b$, until it is intercepted by the partition $d^2$ (see Fig. 7), which deflects it through the pipe and arm whence it returns and passes up and out through the passage $1^c$. It is not deemed necessary to trace the passage of the water from each of the passageways 2, 3, 4, 5 and 6, as the same general scheme of notation is adopted in lettering the drawings.

By reference to Fig. 21 it will be seen that the passage 1 is split at the first partition into the two passages $1^a$ and $1^b$; above the second partition the passage corresponding to $1^b$ becomes $1^c$. Each of the other passages, namely, 2, 3, 4, 5 and 6, are subdivided in the same manner, the only exception with regard to the continuity of each of the several passages occurs in the upper part of the member B and the lower part of the member C, where, as a matter of convenience and to save weight, the partitions which would otherwise exist between some of the ascending cold water passages are dispensed with and large passages marked H, I, J, K, result from such change of structure.

All of the partitions, except those which confine the heated water flowing from the several arms, could be dispensed with without departing from this invention, the specific structural arrangement shown by the drawings being adopted to secure strength.

Each of the overflows or outlets is controlled by a valve $s$ by means of which the amount of water flowing through each arm can be regulated.

It will be understood that in practice mechanism is provided for rotating this shaft, but as such mechanism forms no part of the present invention it has not been shown or described.

What I claim is:—

1. A stirring shaft provided with a plurality of hollow arms, said shaft being also provided with passageways communicating with the interiors of said hollow arms for supplying a cooling medium thereto and with passageways communicating with the interiors of said arms for the discharge of the cooling medium therefrom, a separate discharge passageway being provided for each arm, said passageways of said shaft being adapted to convey the cooling medium in contact with said shaft to cool the same.

2. A stirring shaft provided with a plurality of hollow arms, said shaft being also provided with passageways communicating with the interiors of said hollow arms for supplying a cooling medium thereto and with passageways communicating with the interiors of said arms for the discharge of the cooling medium therefrom, a separate discharge passageway being provided for each arm, and separate means to control the escape of said medium from each of said discharge passageways, said passageways of said shaft being adapted to convey the cooling medium in contact with said shaft to cool the same.

3. A stirring shaft composed of a plurality of sections, some of said sections being provided with passageways which open through an end thereof, some of said sections being provided with hollow arms, the passageways which open through the end of a section being adapted to register with passageways which open through the end of the next adjacent section, some of said passageways communicating with the interiors of said hollow arms for supplying a cooling medium thereto and others of said passageways permitting a discharge of said medium from each individual arm separately.

4. A stirring shaft provided with a plurality of hollow arms, said shaft being also provided with passageways, one of which passageways communicates with the interiors of a plurality of said hollow arms for supplying a cooling medium thereto, other passageways communicating with the interiors of said arms for the discharge of the cooling medium therefrom, a separate discharge passageway being provided for each arm.

5. A stirring shaft provided with a plurality of hollow arms, said shaft being provided with an axially located passageway for supplying a cooling medium to an end thereof, said shaft being also provided with passageways in communication with the aforesaid axially disposed passageway and with the interiors of said hollow arms, said shaft being also provided with other passageways which are in communication with said axially disposed passageway through said hollow arms and said previously mentioned passageways.

In testimony whereof, I affix my signature in the presence of two witnesses.

GRANT B. SHIPLEY.

Witnesses:
 G. F. DE WEIN,
 FRANK E. DENNETT.